Aug. 1, 1961
J. B. BIDWELL
2,994,396
SUSPENSION AND STEERING ASSEMBLY
Filed Sept. 21, 1959
3 Sheets-Sheet 1
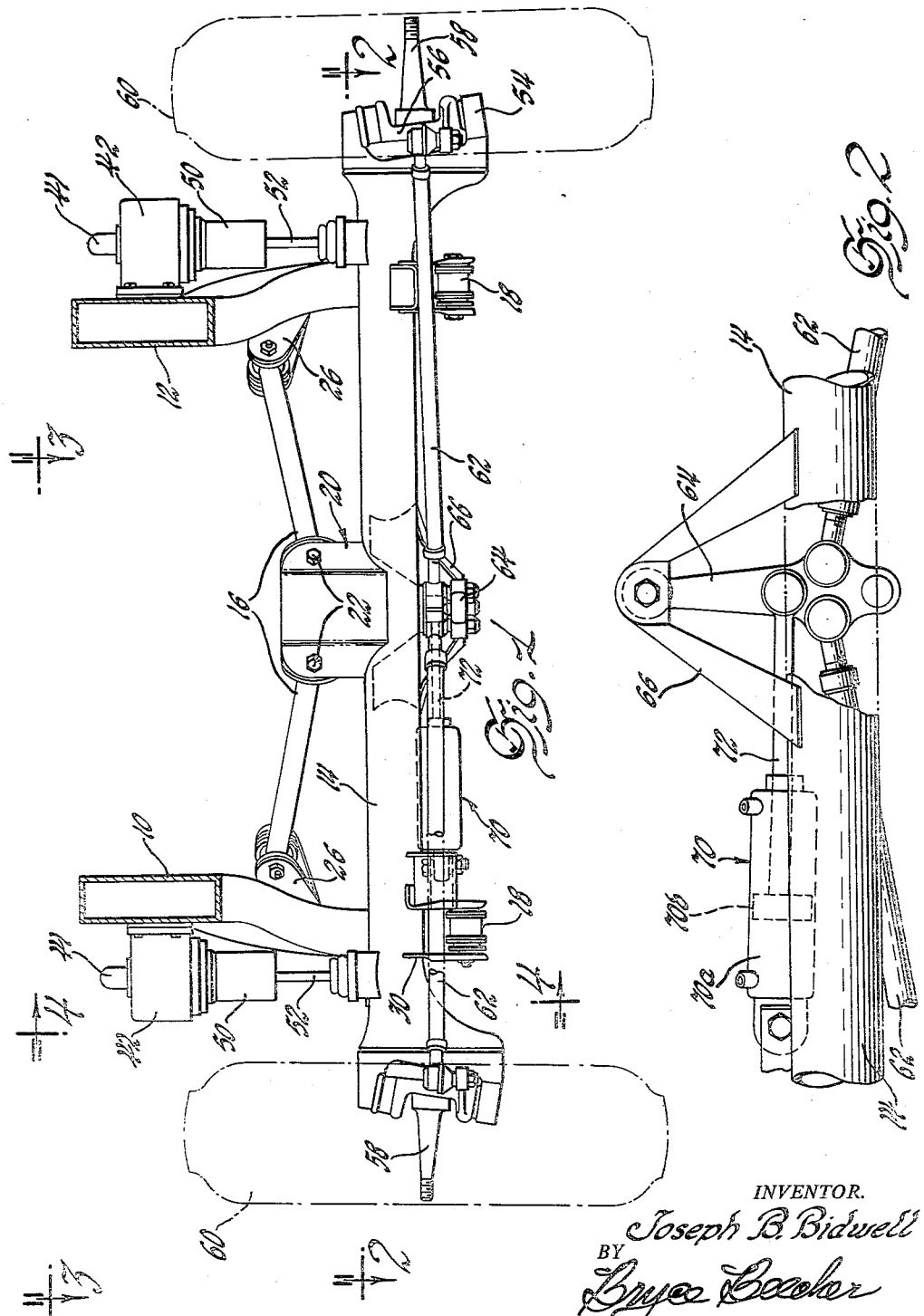
INVENTOR.
Joseph B. Bidwell
BY
Bryce Beecher
ATTORNEY

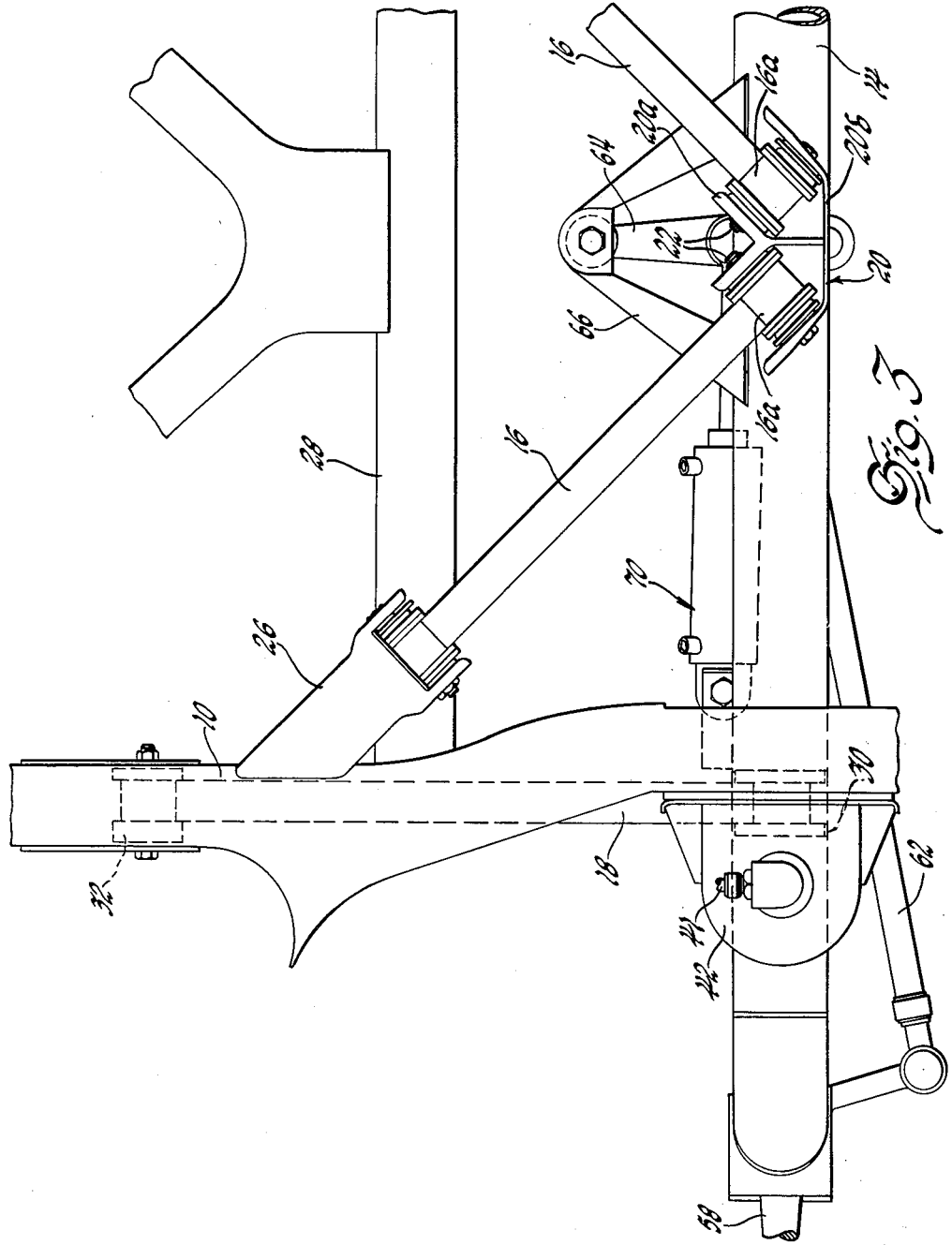

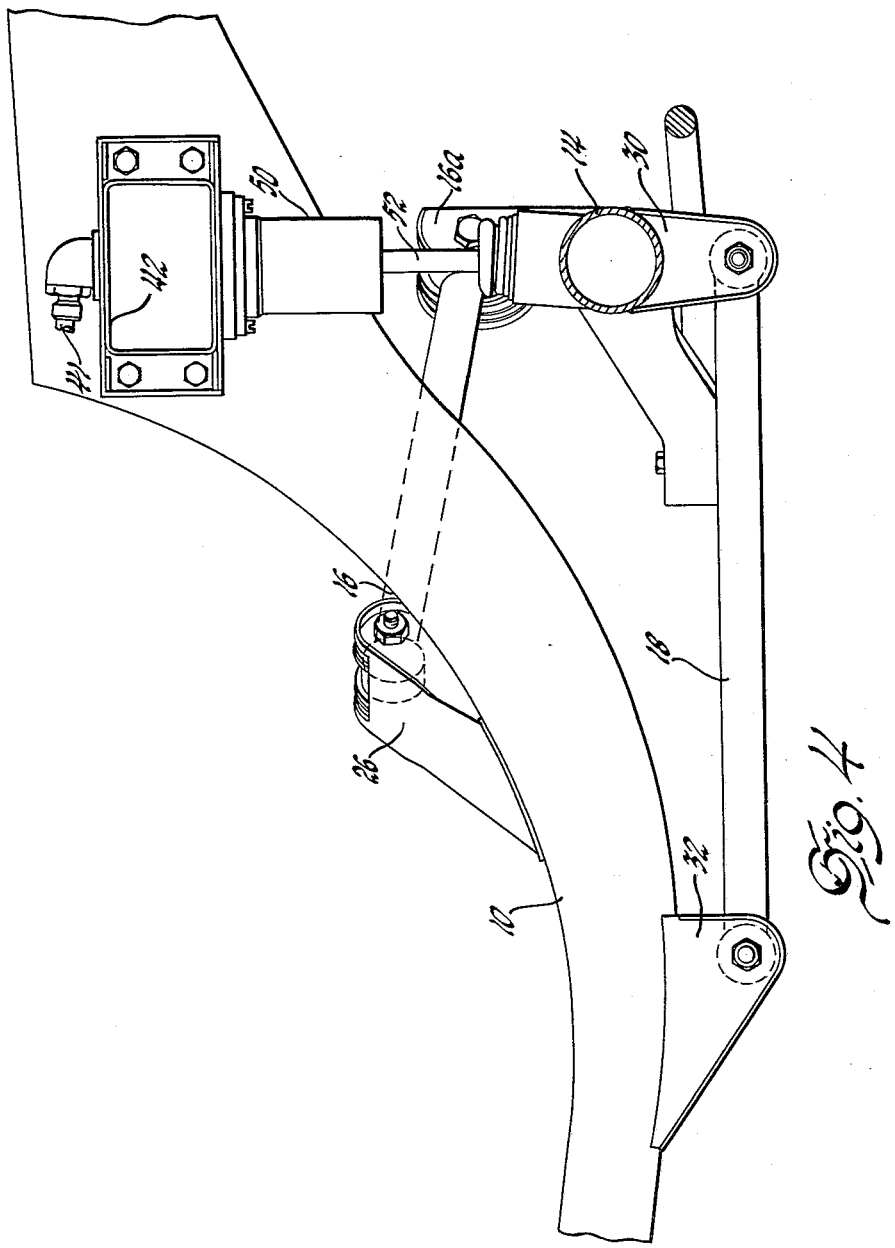

2,994,396
SUSPENSION AND STEERING ASSEMBLY
Joseph B. Bidwell, Birmingham, Mich., assignor to General Motors Corporation, Detroit, Mich., a corporation of Delaware
Filed Sept. 21, 1959, Ser. No. 841,274
7 Claims. (Cl. 180—79.2)

This invention relates to a front suspension and steering assembly for self-propelled vehicles, particularly automobiles.

The assembly comprises a rigid axle, preferably of tubular construction, which not only mounts the spring means but carries the steering linkage components together with the power booster if the vehicle is power steered. A plurality of links pivotally connected to the axle are adapted for pivotal attachment to the frame of the vehicle and transmit braking and acceleration loads thereto. These links are easily arranged to provide the desired roll center height and to arrest the diving tendency on braking.

The described construction has been found to provide large maximum side force capability due to the dirigible wheels remaining perpendicular to the road surface regardless of the motion of the vehicle body on the springs. Thus, the vehicle exhibits improved cornering and tracking characteristics. A further advantage of the assembly resides in the fact that for any given angular disposition of the steering wheel or equivalent instrumentality, the dirigible wheels have a corresponding angulation which is constant. This is opposed to the situation with a suspension system where the dirigible wheels are independently sprung and the steering linkage is supported by the frame of the vehicle. There, due to the relative motion between the steering linkage and the dirigible wheels, there can be no such correspondence.

The elimination of any tendency of the dirigible wheels to shimmy from gyroscopic forces around the king pin axis is eliminated by the assembly herein where the same, as preferred, incorporates a fluid-actuated power booster governed by a closed center valve, i.e., a valve which in neutral position prevents exhaustion of fluid from the booster. A particular use contemplated for the assembly, as employed with such a booster, is in a vehicle provided with the "unicontrol" system described in copending application Serial No. 727,980, filed April 11, 1958, in the names of Joseph B. Bidwell, the present applicant, and Roy S. Cataldo. In such case, the booster is controlled by the servo unit referred to in the application, the unit taking the form of an electrically-actuated valve.

The principal objects of the invention being implicit in the foregoing, the same will not be described with reference to the accompanying drawings illustrating a preferred embodiment. In the drawings:

FIGURE 1 is a rear end view of the assembly;
FIGURE 2 is an enlarged fragmentary plan taken on the line 2—2 in FIGURE 1;
FIGURE 3 is an enlarged fragmentary plan taken on a higher plane and looking in the direction of the arrows 3—3 in FIG. 1; and
FIGURE 4 is an enlarged fragmentary side elevation taken on the line 4—4 in FIG. 1.

Referring first to FIG. 1, the numerals 10 and 12 denote the frame side rails of a vehicle. As should be clear from such figure taken with FIG. 4, the rail components in the area of the suspension and steering assembly extend downwardly, slightly outwardly and forwardly—as viewed from the rear.

A tubular axle 14 is located with reference to the rails 10 and 12 by a pair of links 16 and a second pair of links 18. Links 16 are attached to the axle through bracket means 20 welded or otherwise fixedly secured to the top of the axle. Such means (FIG. 3) includes a Y portion 20a and a bent-plate portion 20b both formed with under surfaces curved in correspondence with the axle. The two portions, which may or may not be integral, support bolts 22 encircled by the eye ends 16a of the links 16, the pivotal connections thus made being preferably rubber bushed. At their ends opposite the bracket means 20, links 16 terminate in eyes surrounding bolts carried by brackets 26 suitably fixedly secured to the rails 10 and 12. Brackets 26 are disposed above a crossframe member 28 interconnecting the rails 10 and 12.

As clearly appears from the drawings, links 16 extend divergingly forwardly and slightly upwardly of the axle 14, while links 18 extend forwardly of the axle in substantially straight parallel relation. The latter links are attached to the axle 14 and to the rails 10 and 12 in the general manner of the links 16, each being pivotally connected to a bracket 30 secured to the axle and a bracket 32 secured to the corresponding frame side rail (FIG. 4).

Reservoirs 42, above mentioned, are functional with respect to air springs 50 and are supplied with air under pressure through a fixture 41. The operation of such spring means being well understood in the art, detailed description thereof is not considered necessary here. Suffice it to say that each spring incorporates a piston, the shaft 52 of which is linked to the axle 14.

The use of air springs is not required according to the invention, the same being equally applicable to installations incorporating metal coil springs, for example.

Axle 14, it is to be noted, terminates at either end in a yoke 54 the legs of which mount kingpins on which a steering knuckle 56 pivots. Each steering knuckle 56 carries a spindle 58 for a dirigible wheel 60. A steering linkage member 62 pivotally connected to each steering knuckle 56 is pivotally connected also to a steering arm 64. The forward end of this arm 64 is afforded pivotal support by a bracket 66 fixedly secured to the axle 14. It is to be observed that the body of the arm 64 is disposed beneath the axle and that the links 62 extend outwardly from the arm to points rearwardly of the axle for connection to the steering knuckles.

In the case of the particular embodiment, a hydraulic or pneumatic power jack 70 supplies the force required to swing the arm 64 and the associated linkage. The jack 70 comprises a cylinder component 70a and a piston component 70b having a shaft 72 through which the connection with the arm 64 is made. Cylinder 70a is pivotally connected to the axle 14 and reacts thereagainst in the operation of the jack. Any suitable pump may be employed to provide the fluid pressure required for the operation of the jack.

The invention being thus described and illustrated, what is claimed is:

1. In a suspension and steering assembly for application to the front end of an automotive vehicle, an axle having dirigible means at either end thereof, spring means carried by said axle and adapted for connection to the frame of the vehicle, a pair of thrust links pivotally connected to said axle substantially centrally of the length thereof and extending divergingly forwardly of the axle as the same is applied as a component of said assembly, said links at their forward ends being adapted for pivotal connection to said frame, bracket means fixed to said axle substantially centrally of the length thereof, a steering arm pivotally connected to said bracket means, linkage means connecting said arm to said dirigible means, said linkage means being supported by said bracket means through said arm, and a second pair of thrust links pivotally connected to said axle and extending forwardly thereof in substantially straight parallel relation, said last links being located one near either end of said axle and being adapted for pivotal connection to said frame.

2. In a suspension and steering assembly for application to the front end of an automotive vehicle, an axle having dirigible means at either end thereof, spring means carried by said axle and adapted for connection to the frame of the vehicle, a pair of thrust links pivotally connected to said axle substantially centrally of the length thereof and extending divergingly forwardly and upwardly of the axle as the same is applied as a component of said assembly, said links at their forward ends being adapted for pivotal connection to said frame, bracket means fixed to said axle centrally of the length thereof, a steering arm pivotally connected to said bracket means, the body of said arm being disposed in underlying angular relation to said axle, a pair of linkage element diverging rearwardly of said arm for connection to said dirigible means, said linkage elements being supported by said bracket means through said arm and a second pair of thrust links pivotally connected to said axle and extending forwardly thereof in substantially straight parallel relation, said last links being located one near either end of said axle and being adapted for pivotal connection to said frame.

3. In a suspention and steering assembly for application to the front end of an automative vehicle, a tubular axle having a dirigible wheel at either end thereof, spring means carried by said axle and adapted for connection to the frame of the vehicle, a pair of thrust links pivotally connected to a bracket fixed to the top of said axle centrally of the length thereof, said links extending divergingly forwardly and upwardly of the axle as the same is applied as a component of said assembly and being adapted at their forward ends for pivotal connection to said frame, a steering arm pivotally supported at one end by bracket means extending forwardly of said axle substantially centrally of the length thereof, the body of said arm being disposed in underlying angular relation to said axle, a pair of linkage elements diverging rearwardly of said arm for connection to said dirigible wheels, said linkage elements being pivotally connected to said arm near the other end thereof and being supported by said last bracket means through said arm, and a second pair of thrust links pivotally connected to bracket elements fixed to the bottom of said axle and located one near either end thereof, said last links extending forwardly of said axle in substantially straight parallel relation and being adapted at their terminal ends for pivotal connection to said frame.

4. An assembly as defined by claim 3 further comprising a power cylinder having pivotal connection with said axle and disposed in substantially parallel relation thereto, said power cylinder being operably connected to said steering arm.

5. In a suspension and steering assembly for application to the front end of an automotive vehicle, an axle having dirigible means at either end thereof, spring means carried by said axle and adapted for connection to the frame of the vehicle, a pair of thrust links pivotally connected to said axle substantially centrally of the length thereof and extending divergingly forwardly of the axle as the same is applied as a component of said assembly, said links at their forward ends being adapted for pivotal connection to said frame, bracket means fixedly connected to said axle centrally of the length thereof, a steering arm pivotally connected to said bracket means, power means operably connected to said arm and reacted to said axle, linkage means connecting said arm to said dirigible means, said linkage means being supported by said bracket means through said arm, and a second pair of thrust links pivotally connected to said axle and extending forwardly thereof in substantially straight parallel relation, said last links being located one near either end of said axle and being adapted for pivotal connection to said frame.

6. In a suspension and steering assembly for application to the front end of an automotive vehicle, an axle having dirigible means at either end thereof, a pair of thrust links pivotally connected to said axle substantially centrally of the length thereof and extending divergingly forwardly of the axle as the same is applied as a component of said assembly, said links at their forward ends being adapted for pivotal connection to the frame of the vehicle, bracket means fixedly connected to said axle substantially centrally of the length thereof, a steering arm pivotally connected to said bracket means, linkage means connecting said arm to said dirigible means, said linkage means being supported by said bracket means through said arm, spring means atop said axle near either end thereof and adapted for attachment to the vehicle frame, and a second pair of thrust links pivotally connected to said axle and extending forwardly thereof in substantially straight parallel relation, said last links being located one at either end of said axle and being adapted for pivotal connection to said frame.

7. In a suspension and steering assembly for application to the front end of an automotive vehicle, a tubular axle having a dirigible wheel at either end thereof, a pair of thrust links pivotally connected to a bracket fixed to the top of said axle centrally of the length thereof, said links extending divergingly forwardly and upwardly of the axle as the same is applied as a component of said assembly and being adapted at their forward ends for pivotal connection to the frame of the vehicle, a steering arm pivotally supported at one end by bracket means extending forwardly of said axle substantially centrally of the length thereof, the body of said arm being disposed in underlying angular relation to said axle, a pair of linkage elements diverging rearwardly of said arms for connection to said dirigible wheels, said linkage elements being pivotally connected to said arm near the other end thereof and being supported by said last bracket means through said arm, an air spring mounted atop said axle near either end thereof and adapted for connection to the vehicle frame, and a second pair of thrust links pivotally connected to bracket elements fixed to the bottom of said axle and located one near either end thereof inwardly of said air springs, said last links extending forwardly of said axle in substantially straight parallel relation and being adapted at their terminal ends for pivotal connection to said frame.

References Cited in the file of this patent

UNITED STATES PATENTS

| | | |
|---|---|---|
| 820,707 | Downer | May 15, 1906 |
| 1,141,360 | Rudd | June 1, 1915 |
| 2,779,427 | Lincoln et al. | Jan. 29, 1957 |
| 2,865,650 | Chalmers et al. | Dec. 23, 1958 |
| 2,888,271 | Butterfield | May 26, 1959 |